(12) United States Patent
Slade et al.

(10) Patent No.: US 12,260,971 B2
(45) Date of Patent: Mar. 25, 2025

(54) ALIGNMENT OF HTS TAPES

(71) Applicant: Tokamak Energy Ltd, Abingdon (GB)

(72) Inventors: Robert Slade, Abingdon (GB); Greg Brittles, Abingdon (GB); Bas Van Nugteren, Abingdon (GB)

(73) Assignee: Tokamak Energy Ltd, Abingdon (GB)

( * ) Notice: Subject to any disclaimer, the term of this patent is extended or adjusted under 35 U.S.C. 154(b) by 769 days.

(21) Appl. No.: 17/273,630

(22) PCT Filed: Aug. 30, 2019

(86) PCT No.: PCT/GB2019/052435
§ 371 (c)(1),
(2) Date: Mar. 4, 2021

(87) PCT Pub. No.: WO2020/049281
PCT Pub. Date: Mar. 12, 2020

(65) Prior Publication Data
US 2021/0343452 A1 Nov. 4, 2021

(30) Foreign Application Priority Data
Sep. 4, 2018 (GB) .................................. 1814357

(51) Int. Cl.
*H01B 12/02* (2006.01)
*G21B 1/21* (2006.01)
(Continued)

(52) U.S. Cl.
CPC .............. *H01B 12/02* (2013.01); *G21B 1/21* (2013.01); *H01F 6/06* (2013.01); *G21B 1/057* (2013.01)

(58) Field of Classification Search
CPC .............. H01B 12/02; H01F 6/06; G21B 1/21
See application file for complete search history.

(56) References Cited

U.S. PATENT DOCUMENTS

2020/0381154 A1* 12/2020 Slade .................... G21B 1/057

FOREIGN PATENT DOCUMENTS

| CN | 101512829 A | 8/2009 |
| CN | 102177596 A | 9/2011 |

(Continued)

OTHER PUBLICATIONS

International Search Report and Written Opinion for Application No. PCT/GB2019/052435 dated Nov. 14, 2019 (13 pages).
(Continued)

*Primary Examiner* — Paul A Wartalowicz
(74) *Attorney, Agent, or Firm* — Michael Best & Friedrich LLP (57) ABSTRACT

A cable for carrying electrical current in a coil of a magnet. The cable comprises a stack of tape assemblies. Each tape assembly has a length and a width, such that the length is much larger than the width, and each tape assembly comprises an HTS layer of anisotropic high temperature superconductor. HTS material, wherein a c-axis of the HTS layer is at a non-zero angle to a vector perpendicular to the plane of the HTS layer. The tape assemblies are stacked as a series of pairs, each pair comprising first and second HTS tape assemblies and a copper layer therebetween. The tape assemblies in each pair are arranged such that the c-axis of the HTS layer of the first HTS tape assembly of each pair have reflective symmetry to the c-axis of the HTS layer of the second HTS tape assembly of each pair about a plane which is parallel to and equidistant from each HTS layer.

18 Claims, 6 Drawing Sheets

(51) Int. Cl.
    *H01F 6/06*     (2006.01)
    *G21B 1/05*     (2006.01)

(56)     References Cited

FOREIGN PATENT DOCUMENTS

| | | |
|---|---|---|
| CN | 102576583 A | 7/2012 |
| CN | 102834879 A | 12/2012 |
| CN | 102844823 A | 12/2012 |
| CN | 103069596 A | 4/2013 |
| CN | 107611249 A | 1/2018 |
| DE | 102010038656 A1 | 2/2012 |
| EP | 1039483 A1 | 9/2000 |
| JP | H0337913 A | 2/1991 |
| JP | H06223648 A | 8/1994 |
| JP | 2002220230 A | 8/2002 |
| JP | 2008251564 A | 10/2008 |
| KR | 20010032917 A | 4/2001 |
| KR | 20080064799 A | 7/2008 |
| WO | 0108234 A2 | 2/2001 |
| WO | 2015011491 A1 | 1/2015 |
| WO | 2018078326 A1 | 5/2018 |

OTHER PUBLICATIONS

United Kingdom Intellectual Property Office Search Report for Application No. GB1814357.8 dated Jan. 10, 2019 (3 pages).
International Preliminary Report on Patentability for Application No. PCT/GB2019/052435 dated Mar. 9, 2021 (8 pages).
Translation of Korean Patent Office Action for Related Application No. 10-2021-7009954 dated Dec. 1, 2022 (4 pages).
Intellectual Property of India Office Action for Application No. 202117014953 dated Aug. 10, 2022 (5 pages).
Chinese Patent Office Action for Application No. 2019800721631 dated Oct. 20, 2023 (7 pages including English machine translation of p. 3).

\* cited by examiner

ALIGNMENT OF HTS TAPES

FIELD OF THE INVENTION

The present invention relates to high temperature superconductors (HTS). In particular, the present invention relates to cables comprising HTS tapes.

BACKGROUND

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a critical temperature (the temperature above which the material cannot be superconducting even in zero magnetic field) below about 30K. The behaviour of HTS material is not described by BCS theory, and such materials may have critical temperatures above about 30K (though it should be noted that it is the physical differences in superconducting operation and composition, rather than the critical temperature, which define HTS material). The most commonly used HTS are "cuprate superconductors"—ceramics based on cuprates (compounds containing a copper oxide group), such as BSCCO, or ReBCO (where Re is a rare earth element, commonly Y or Gd). Other HTS materials include iron pnictides (e.g. FeAs and FeSe) and magnesium diboride ($MgB_2$).

Figure 1:
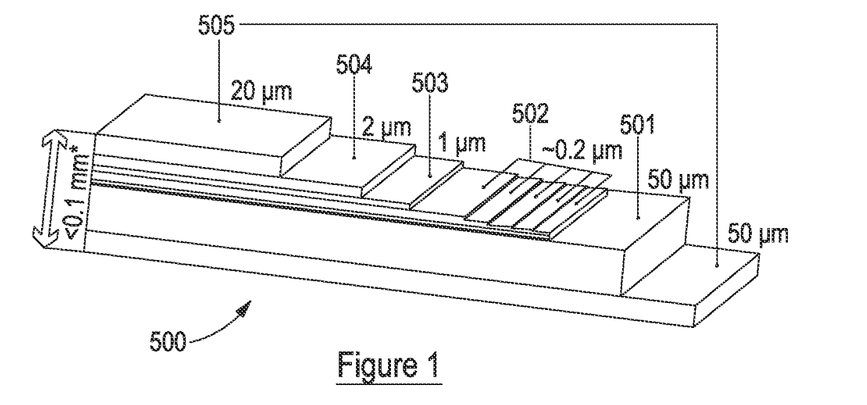
FIG. 1 is an illustration of the structure of ReBCO tape.

ReBCO is typically manufactured as tapes, with a structure as shown in FIG. 1. Such tape 500 is generally approximately 100 microns thick, and includes a substrate 501 (typically electropolished hastelloy approximately 50 microns thick), on which is deposited by IBAD, magnetron sputtering, or another suitable technique a series of buffer layers known as the buffer stack 502, of approximate thickness 0.2 microns. An epitaxial ReBCO-HTS layer 503 (deposited by MOCVD or another suitable technique) overlays 15 the buffer stack, and is typically 1 micron thick. A 1-2 micron silver layer 504 is deposited on the HTS layer by sputtering or another suitable technique, and a copper stabilizer layer 505 is deposited on the tape by electroplating or another suitable technique, which often completely encapsulates the tape.

The substrate 501 provides a mechanical backbone that can be fed through the manufacturing line and permit growth of subsequent layers. The buffer stack 502 is required to provide a biaxially textured crystalline template upon which to grow the HTS layer, and prevents chemical diffusion of elements from the substrate to the HTS which damage its superconducting properties. The silver layer 504 is required to provide a low resistance interface from the ReBCO to the stabiliser layer, and the stabiliser layer 505 provides an alternative current path in the event that any part of the ReBCO ceases superconducting (enters the "normal" state).

Figure 2:
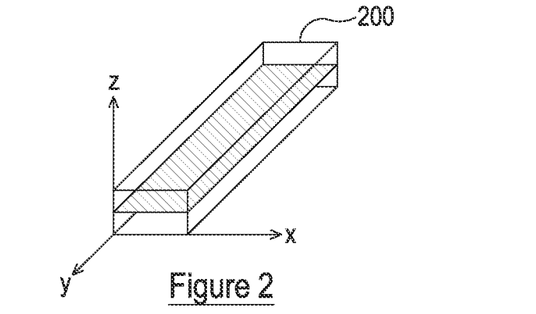
FIG. 2 is a diagram showing a coordinate system for describing ReBCO tape.

FIG. 2 shows a ReBCO tape 200, illustrating an x,y,z coordinate system which will be used in this document. The y axis is along the length of the tape (i.e. in the direction of the current when the tape is in use), the x axis is along the width of the tape (i.e. in the plane of the tape, perpendicular to the y axis), the z axis is perpendicular to the x and y axes (i.e. normal to the plane of the tape).

Figure 3:
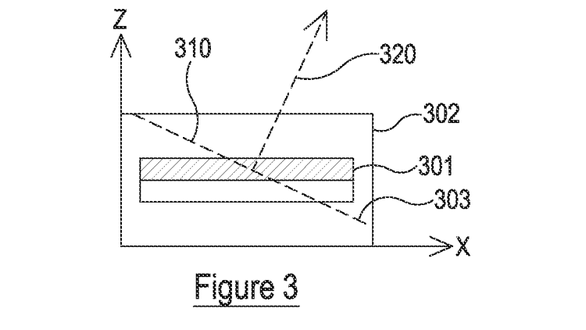
FIG. 3 is a pair of cross sections of a ReBCO tape, showing the principal axes of the ReBCO crystal.

FIG. 3 shows a cross section of an exemplary ReBCO tape in the x/z plane. . . . The ReBCO layer itself is crystalline, and the principal axes of the ReBCO crystal are shown for one point in the tape. The ReBCO tape is shown in simplified form with an HTS layer 301, a copper cladding 302, and a substrate 303. The crystal structure of ReBCO has three principal axes which are mutually perpendicular, referred to in the art as a, b, and c. For the purposes of this disclosure, we ignore any dependence of critical current on the orientation of the magnetic field component in the ab plane, so that the a and b axes can be considered interchangeable, so they will be considered only as the a/b plane (i.e. the plane defined by the a and b axes). In FIG. 3 the a/b plane of the ReBCO layer 301 is shown as a single line 310, perpendicular to the c-axis 320.

The critical current of the tape depends on the ReBCO crystal thickness and quality. It also has an approximately inverse dependence on the ambient temperature and also the magnitude of the applied magnetic field. Finally, the ReBCO HTS layer displays anisotropic critical current behaviour, ie: the critical current depends on the orientation of the applied magnetic field with respect to the c-axis. When the applied magnetic field vector lies in the a/b plane 310 the critical current is considerably higher than when the applied magnetic field vector is aligned along the c-axis 320. The critical current varies smoothly between these two extremes in "out of a/b plane" field orientation, as shown by the blue curve in FIG. 6a. (In practice, there may be more than one angle at which critical current shows a peak. Furthermore, the amplitude and width of the peaks vary with both applied field and temperature, but for the purposes of this explanation we can consider a tape with a single dominant peak that defines the optimum orientation of applied B field that gives maximum critical current).

ReBCO tapes are normally manufactured so that the c-axis is as close to perpendicular to the plane of the tape as possible. However, there is likely to be some variability in the angular offset between the c-axis and z-axis orientations along the tape, due to variation in manufacturing processes. This offset is likely to comprise a fixed offset, plus a variable offset that changes with position along the tape. For a fixed magnetic field orientation this angular offset between c-axis and z-axis leads to variation of the critical current along the tape. This is undesirable when the tape pair is carrying a transport current near the combined critical current of the individual tapes, because reductions in the critical current caused by this variability may force enough transport current to share into the copper layer over a long enough distance to create a hotspot which leads to thermal runaway and a localized quench.

SUMMARY

According to a first aspect, there is provided a cable for carrying electrical current in a coil of a magnet. The cable comprises a stack of tape assemblies. Each tape assembly has a length and a width, such that the length is much larger than the width, and each tape assembly comprises an HTS layer of anisotropic high temperature superconductor, HTS material, wherein a c-axis of the HTS layer is at a non-zero angle to a vector perpendicular to the plane of the HTS layer. The tape assemblies are stacked as a series of pairs, each pair comprising first and second HTS tape assemblies and a copper layer therebetween. The tape assemblies in each pair are arranged such that the c-axis of the HTS layer of the first HTS tape assembly of each pair have reflective symmetry to the c-axis of the HTS layer of the second HTS tape assembly of each pair about a plane which is parallel to and equidistant from each HTS layer.

According to a second aspect there is provided a method of manufacturing a cable for carrying electric current in a coil of a magnet. First and second tape assemblies are provided, each tape assembly comprising a high-strength metal substrate layer, and an HTS layer of anisotropic high temperature superconductor, HTS, material, wherein a c-axis of the HTS layer is at a non-zero angle to a vector perpendicular to the plane of the HTS layer. The first tape assembly is applied to a copper layer. The second tape assembly is applied to the copper layer, such that the HTS layer of the first tape and the HTS layer of the second tape are parallel and separated by the copper layer, and such that a c-axis of the second HTS tape assembly has reflective symmetry to the c-axis of the HTS layer of the second HTS tape assembly of each pair about a plane which is parallel to and equidistant from each HTS layer.

DETAILED DESCRIPTION

The invention describes a method of combining pairs of HTS tapes such that any variation in the angle at which peak critical current occurs along the tape is averaged out in the pair, leading to a more consistent behaviour.

Figure 4:
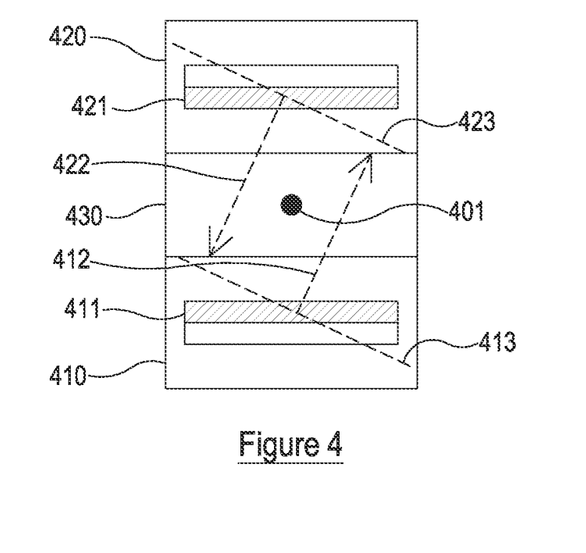
FIG. 4 is a cross sections of a type 0 pair.

FIG. 4 shows an exemplary type-0 pair of ReBCO tapes in a cross section perpendicular to the axis of the tape. A type-0 pair comprises two tapes 410, 420, oriented such that the ReBCO layers 411, 421 face each other, and with a copper lamination 430 between them. In the event of a flaw or "dropout" in critical current in one tape (such as a crack), this allows current to transfer between the ReBCO layers 411, 421 via the copper lamination, which has low resistivity. The resistance between pairs of ReBCO is lower in this orientation that the more common arrangement of simply stacking tapes with the HTS layers facing in the same direction (type-1 pairs).

Each tape has a c-axis 412, 422 at an angle α from the perpendicular to the plane of the ReBCO layer (i.e. the z-axis), and a peak Ic angle (i.e. the angle of applied magnetic field for which the critical current is greatest) which is perpendicular to the c-axis.

Conventionally, the type-0 pair would be constructed by first applying the tape 410 from a spool of ReBCO tape to the copper lamination 430 from one end to the other and then applying the tape 420 from the same spool of HTS tape in the same direction on the opposite side of the copper lamination. This results in the c-axis of the ReBCO 412, 422 and the a/b plane 413, 423 (i.e. the angle of applied magnetic field for which Ic is maximised) being oriented as shown in FIG. 4, with rotational symmetry about the y axis 401 of the type-0 pair.

Figure 5:
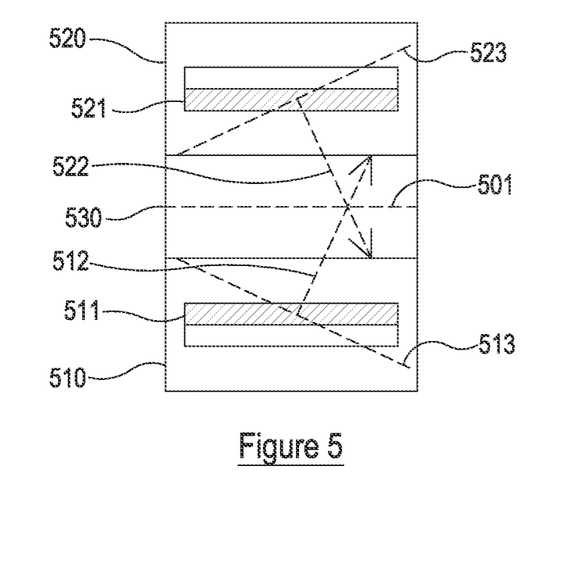
FIG. 5 is a cross sections of an exemplary type 0 pair.

As an alternative, the type-0 pair can be constructed as shown in FIG. 5, which is a cross section equivalent to FIG. 4 for an exemplary type-0 pair construction. The tapes 510, ReBCO layers 511 and copper lamination 530 are equivalent to the tape 410, ReCBO layer 511, and copper lamination 430 of FIG. 4. The tape 520 has been applied such that the ReBCO layer 421 faces the ReBCO layer 511 of the tape 510, and such that the c-axes 511, 521 and a/b planes 512, 522 of each tape 510, 520 have reflective symmetry about a plane 501 which is parallel to and equidistant from each tape of the type-0 pair.

The application of the tape to form the construction of FIG. 5 (i.e. a "flipped pair") can be done by first applying the tape 510 from a spool of ReBCO tape in one direction), and then applying the tape 520 from the same roll of ReBCO tape in the opposite direction along the y-axis. Alternatively, the ReBCO tape may be unwound from the spool between application of the tape 510 and application of the tape 520, and rewound in the opposite direction, then the tape 520 is applied in the same direction as the application of the tape 510. As a further alternative, the tape 510 and the tape 520 may be applied in the same direction from different rolls, which have been wound in opposite senses, to produce the correct alignment of the c-axes.

If the tape does not need to be applied directly from a spool, the "flipped pair" orientation is most easily achieved by:
1. Spooling off two equal lengths of tape from a spool.
2. Turning over one tape about its y axis so that the HTS coated sides face each other.
3. Rotating one tape 180 degrees lengthways about the z-axis.

Alternatively, this can be achieved by spooling off one tape of greater than twice the required length, folding it in the middle about the x axis (i.e. end-to-end), and cutting off or otherwise removing a section containing the fold, to leave two tapes which are then arranged in a type-0 pair in a "flipped" orientation (or a type-2 pair if the tape is folded such that the substrates face each other).

Figure 6A:
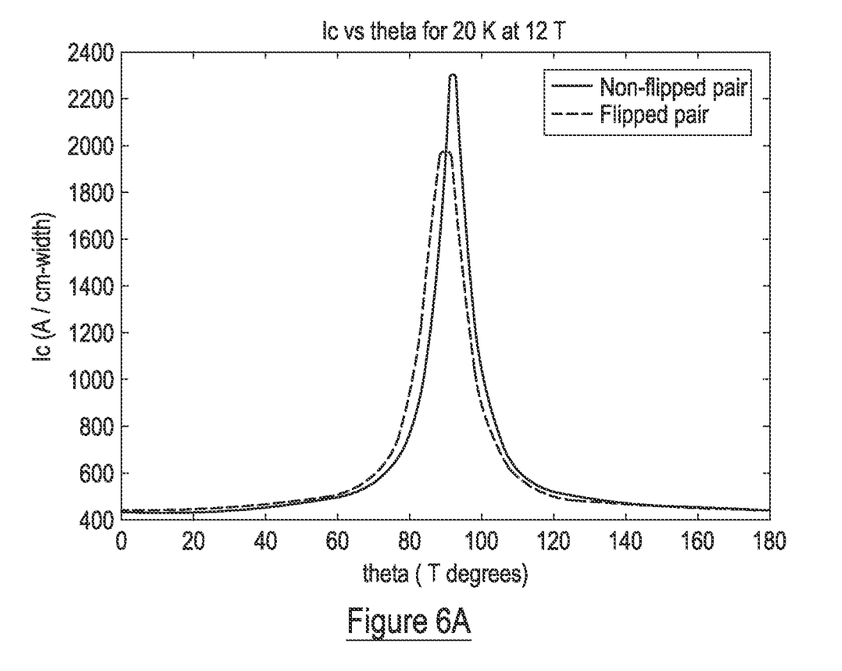
FIGS. 6A, 6B, 6C, and 6D show the critical current variation with external magnetic field of the constructions of FIGS. 4A/B and 5A/B for different ReBCO tapes.
Figure 6B:
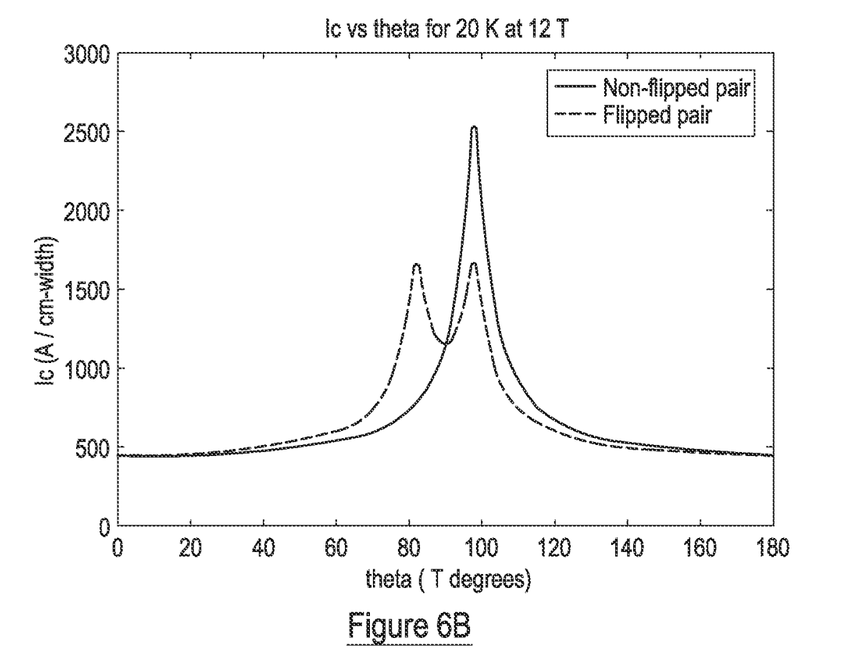
Figure 6C:
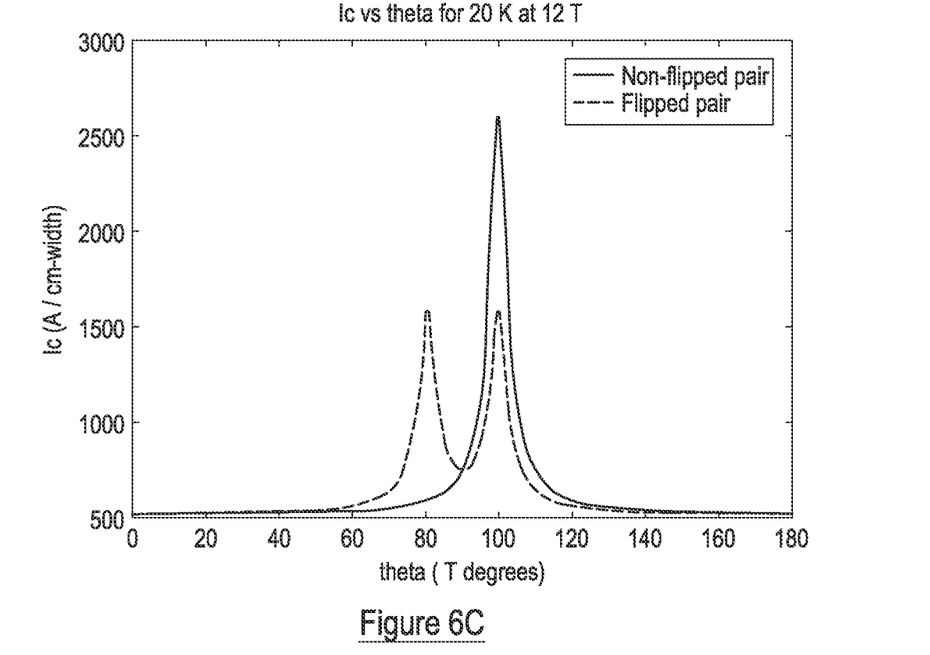
Figure 6D:
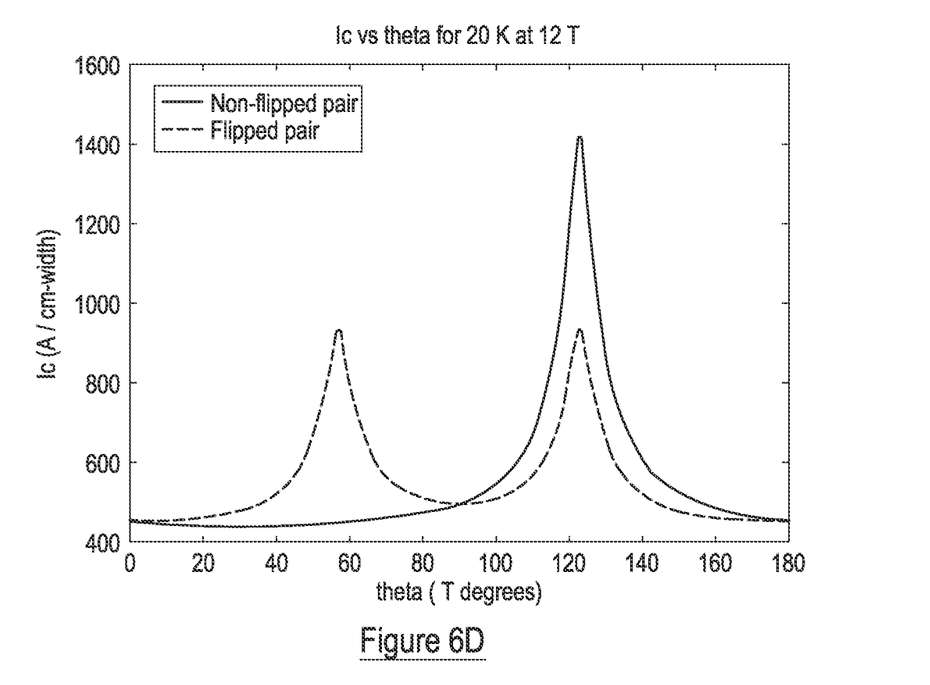

FIGS. 6A to 6D show plots of the critical current vs angle of magnetic field for type-0 pairs constructed according to FIG. 4 (blue line) or FIG. 5 (red line), for tapes with an angle between the c-axis and the perpendicular of the tape of approximately 1 degree (FIG. 6A), 5 degrees (FIG. 6B), 10 degrees (FIG. 6C) and 35 degrees (FIG. 6D).

As can be seen from the figures, the use of the construction of FIG. 5 results in a lower peak critical current, but a range of relatively high critical currents across a broader range of angles. For a tape in which the c-axis is exactly aligned with the perpendicular to the tape (z-axis), the two constructions are equivalent.

For tapes with a small angle (<5 degrees) offset between the c-axis and z-axis, the flipped-pair arrangement has the beneficial effect of averaging out the impact of any changes in the angle at which peak critical current occurs at any position along the tape. This is because the peaks of the individual tapes in the pair are merge into one lower broader peak, as shown in FIG. 6A (red curve). Small variations in the angular offset along the tape will cause the peak to broaden or sharpen.

Furthermore, where the flipped pair is made from a single reel of tape, if the critical current at the start of the reel is lower or higher than at the end of the reel, as supplied, this will also be averaged out by the flipped type-0 orientation.

The net effect of flipped pair orientation is to average out production variations in peak critical current along the HTS tape. The advantages for translating a magnet design, which assumes uniform critical current along the tape, into a real working magnet are clear.

However, it should be noted that in some commercially available tapes, the c-axis 320 diverges by as much as 30-35 degrees from the perpendicular to the plane of the tape. The flipped pair orientation is less useful with these tapes, because the peak Ic becomes split into two peaks, both lower than the peak in the un-flipped arrangement of tape pairs.

This is illustrated in FIG. 6D.

In addition, the use of the "flipped tape" construction results in a symmetrical distribution of current sharing within a magnet coil wound using the type-0 pairs and pushed close to critical current. FIG. 7A shows a chart of the ratio between current and critical current for a cross section of a pancake solenoid magnet coil constructed from a plurality of type-0 pairs according to the construction of FIG. 4, and FIG. 7B shows a chart of the ratio between current I and critical current Ic for a cross section of a magnet coil constructed from a plurality of type-0 pairs according to the construction of FIG. 5 (ie: the "flipped" orientation). Each coil is constructed from two spiral "pancake" windings of type-0 pairs, stacked on top of each other (i.e. one from z=0 to z=12, and one from z=0 to z=−12), with the x axis of all tapes being parallel to the axis of the magnet coil and the tape's z-axis oriented along the radius of the magnet coil. The ReBCO tape used has an angle between the c-axis and the perpendicular to the plane of the tape (z-axis) of 35 degrees. As can be seen from the Figures, the arrangement of FIG. 7B is symmetrical. This leads to symmetric heating due to current sharing, which is more desirable from the perspective of understanding coil performance.

While the above description has focused on arrangements of type-0 pairs of HTS tapes, similar arrangements may be used for type-1 pairs (i.e. where the HTS layer of one tape faces the substrate layer of the other, such that one HTS layer is between the substrates and one is not) or type-2 pairs (i.e. where the substrate layers face each other, such that they are between the HTS layers), arranged such that the c-axes of the HTS tapes have reflective symmetry about a plane parallel to the HTS layers. Furthermore, the above disclosure may also be applied to cases where one or both tapes in a pair are "exfoliated" HTS tape, i.e. HTS tape without a substrate.

Figure 7:
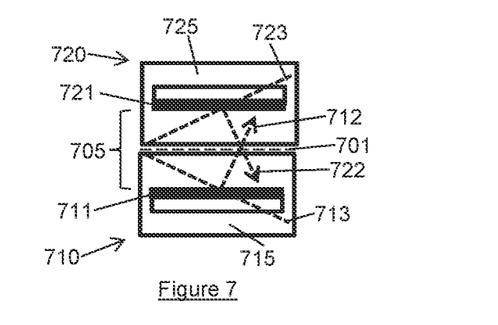
FIG. 7 is a cross section of an exemplary type O pair.
Figure 7A:
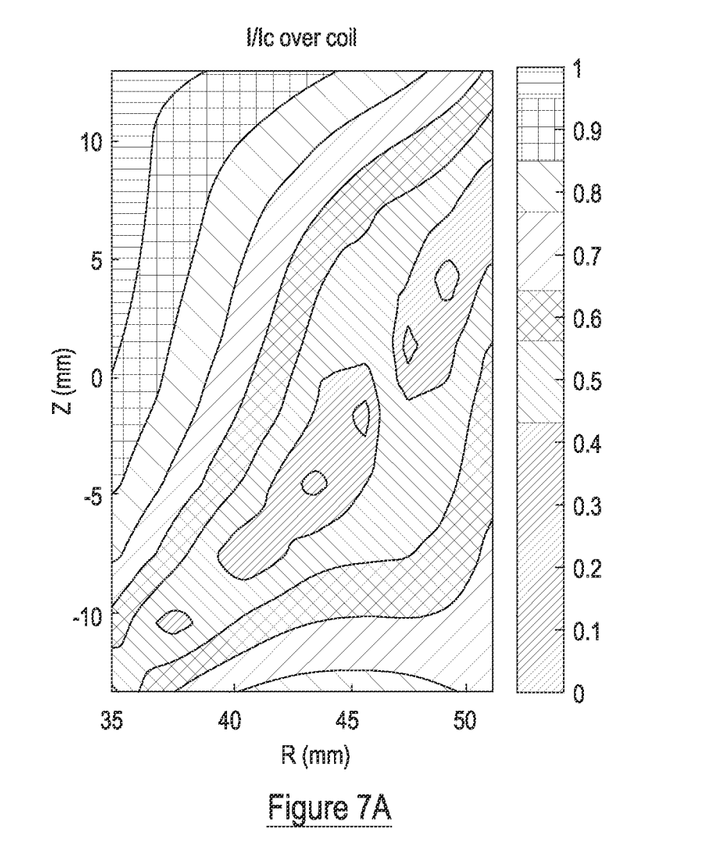
FIG. 7A shows the current ratio of ReBCO within a field coil constructed using the construction of FIG. 4.
Figure 7B:
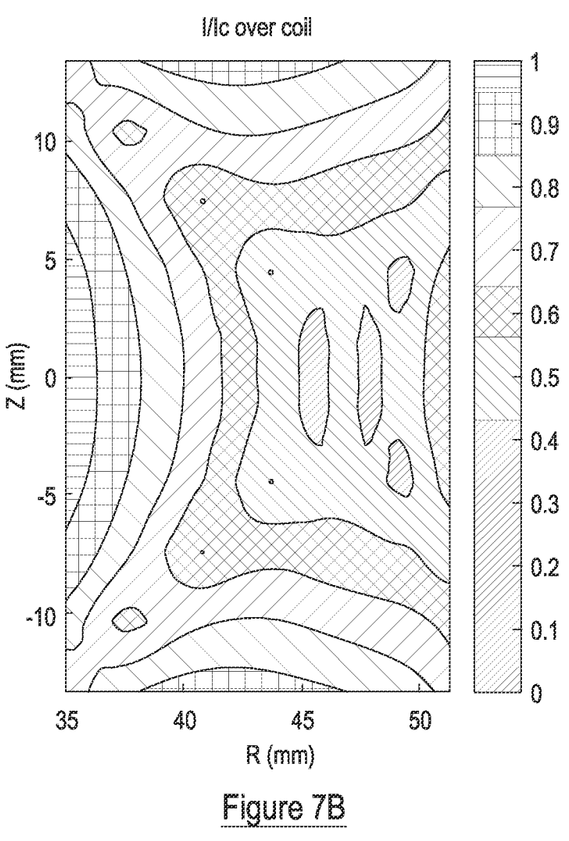
FIG. 7B shows the current ratio of ReBCO within a field coil constructed using the construction of FIG. 5.

FIG. 7 shows a further exemplary type-0 pair. The tapes 710, 720 and ReBCO layers 711, 721 are equivalent to the tapes 510, 520 and ReBCO layers 511, 521 of FIG. 4. The tapes 710, 720 have been applied to each other such that the ReBCO layer 721 of the tape 720 faces the ReBCO layer 711 of the tape 710, portions of the cladding layers 715, 725 form a copper layer 705 between the ReBCO layers, and such that the c-axes 711, 721 and a/b planes 712, 722 of each tape 710, 720 have reflective symmetry about a plane 701 which is parallel to and equidistant from each tape of the type-0 pair.

The invention claimed is:

1. A cable for carrying electrical current in a coil of a magnet, comprising:
    a stack of tape assemblies, each tape assembly having a length and a width, such that the length is much larger than the width and each tape assembly comprises an HTS layer of anisotropic high temperature superconductor, HTS material, wherein a c-axis of the HTS layer is at a non-zero angle to a vector perpendicular to the plane of the HTS layer;
    wherein the tape assemblies are stacked as a series of pairs, each pair comprising first and second HTS tape assemblies and a copper layer therebetween;
    wherein the tape assemblies in each pair are arranged such that the c-axis of the HTS layer of the first HTS tape assembly of each pair have reflective symmetry to the c-axis of the HTS layer of the second HTS tape assembly of each pair about a plane which is parallel to and equidistant from each HTS layer.

2. The cable according to claim 1, wherein each HTS tape assembly comprises a substrate.

3. The cable according to claim 2, wherein each pair is arranged such that the HTS layers of the HTS tape assemblies are arranged between the substrates of the HTS tape assemblies.

4. The cable according to claim 2, wherein each pair is arranged such that the substrates of the tape assemblies are arranged between the HTS layers of the HTS tape assemblies.

5. The cable according to claim 2, wherein each pair is arranged such that one HTS layer is arranged between the substrates of the HTS tape assemblies, and the other HTS layer is arranged outside the substrates of the HTS tape assemblies.

6. The cable according to claim 1, wherein the HTS material is one of:
    ReBCO; and
    BSCCO.

7. The cable according to claim 1, wherein each HTS tape assembly comprises exfoliated HTS tape.

8. The cable according to any claim 1, wherein the thickness of the copper layer is between 10 microns and 400 microns.

9. The cable according to claim 1, wherein the copper layer comprises a copper lamination between the first and second HTS tape assemblies.

10. The cable according to claim 1, wherein each HTS tape assembly comprises a copper cladding, and the HTS layer comprises a portion of the copper cladding of each of the first and second HTS tape assemblies.

11. A method of manufacturing a cable for carrying electric current in a coil of a magnet, the method comprising:
    providing one or more pairs of tape assemblies, each pair comprising a first tape assembly and a second tape assembly, each tape assembly comprising a high-strength metal substrate layer, and an HTS layer of anisotropic high temperature superconductor, HTS, material, wherein a c-axis of the HTS layer is at a non-zero angle to a vector perpendicular to the plane of the HTS layer;
    for each pair:
        applying the first tape assembly to a copper layer; and
        applying the second tape assembly to the copper layer, such that the HTS layer of the first tape and the HTS layer of the second tape are parallel and separated by the copper layer, and such that a c-axis of the second HTS tape assembly has reflective symmetry to the c-axis of the HTS layer of the second HTS tape assembly of each pair about a plane which is parallel to and equidistant from each HTS layer;
    stacking the pairs of tape assemblies to form the cable.

12. The method according to claim 11, wherein the first and second HTS tape assemblies are applied to the copper layer such that the respective HTS layer is between the respective substrate layer and the copper layer.

13. The method according to claim 11, wherein the first and second HTS tape assemblies are applied to the copper layer such that the respective substrate layer is between the respective HTS layer and the copper layer.

14. The method according to claim 11, wherein the first and second HTS tape assemblies are applied to the copper layer such that the HTS layer of the first HTS tape assembly is between the substrate layer of the first HTS tape assembly and the copper layer, and the substrate layer of the second HTS tape assembly is between the HTS layer of the second HTS tape assembly and the substrate layer.

15. The method according to claim 11, wherein each HTS tape assembly comprises exfoliated HTS tape.

16. The method according to claim 11, and comprising partially transferring a master HTS tape assembly from a first reel to a second reel, separating the portion of the master HTS tape assembly on the first reel from the portion of the master HTS tape assembly on the second reel, and applying the first HTS tape assembly from the first reel and the second HTS tape assembly from the second reel.

17. The method according to claim 11, wherein the first HTS tape assembly is applied in the opposite direction along the copper layer to the direction in which the second HTS tape assembly is applied.

18. The method according to claim 11, wherein the first and second HTS tape assemblies are formed by folding a master HTS tape assembly about an axis in the plane of the HTS layer and perpendicular to the length of the master HTS tape assembly, and removing a region of the master HTS tape assembly containing the fold.

\* \* \* \* \*